(12) United States Patent
Strange et al.

(10) Patent No.: US 7,475,770 B1
(45) Date of Patent: Jan. 13, 2009

(54) FLEXIBLE CONVEYOR CARRIER FIXTURE FOR PART TRANSPORT AND METHOD OF USE THEREOF

(75) Inventors: Justin Strange, Marysville, OH (US); Bryan Huret, Powell, OH (US); Doug Potts, Marion, OH (US)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 11/670,068

(22) Filed: Feb. 1, 2007

(51) Int. Cl.
*B65G 37/00* (2006.01)

(52) U.S. Cl. .................................. 198/465.4; 198/345.1

(58) Field of Classification Search .............. 198/678.1, 198/465.4, 680, 682, 345.1, 345.3, 466.1
See application file for complete search history.

(56) References Cited

U.S. PATENT DOCUMENTS

| | | | |
|---|---|---|---|
| 4,404,451 A | 9/1983 | Niikawa et al. | |
| 4,483,476 A | 11/1984 | Fujikawa et al. | |
| 4,538,044 A | 8/1985 | Kadowaki et al. | |
| 4,751,995 A | 6/1988 | Naruse et al. | |
| 4,924,996 A * | 5/1990 | Svensson et al. | 198/345.1 |
| 5,177,862 A | 1/1993 | Speece | |
| 5,267,385 A | 12/1993 | Ikeda et al. | |
| 5,319,840 A | 6/1994 | Yamamoto et al. | |
| 5,374,799 A | 12/1994 | Nishimoto et al. | |
| 5,395,205 A | 3/1995 | Dugas et al. | |
| 5,505,290 A * | 4/1996 | Fujii et al. | 198/345.1 |
| 6,193,046 B1 | 2/2001 | Segawa et al. | |
| 6,340,107 B1 | 1/2002 | Cappa et al. | |
| 6,374,993 B1 * | 4/2002 | Tetzloff | 198/682 |
| 6,378,186 B1 | 4/2002 | Angel | |
| 6,688,451 B2 | 2/2004 | Derby et al. | |
| 6,775,893 B2 | 8/2004 | Constantinescu | |
| 6,814,219 B2 * | 11/2004 | Shimizu | 198/465.4 |
| 6,959,801 B2 * | 11/2005 | Shibata et al. | 198/345.3 |

FOREIGN PATENT DOCUMENTS

JP   SHO 61-8005 Y2   3/1986

* cited by examiner

*Primary Examiner*—James R Bidwell
(74) *Attorney, Agent, or Firm*—Stanley Law Group LLP

(57) ABSTRACT

A flexible conveyor carrier fixture that can be easily and quickly adjusted to allow for the transport of arts along the same conveyor. For example, a flexible conveyor carrier fixture that allows for the transport of dissimilar body panels along the same overhead conveyor. An exemplary conveyor carrier fixture includes a frame to which one or more cross-rails are attached. At least one of the cross-rails is moveable along the carrier frame to permit the repositioning thereof. At least one of the cross rails is preferably provided with a part support, such as a hanger. The position of the moveable cross-rail(s) can preferably be secured by a releasable retention mechanism. The repositionability of the cross-rail(s) allows the carrier fixture to support a greater number of dissimilar body panels.

32 Claims, 14 Drawing Sheets

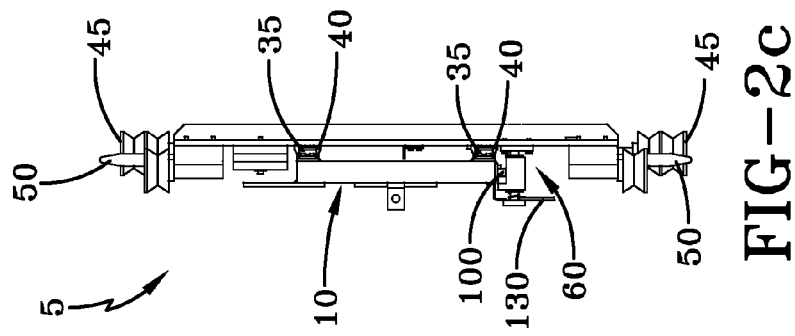
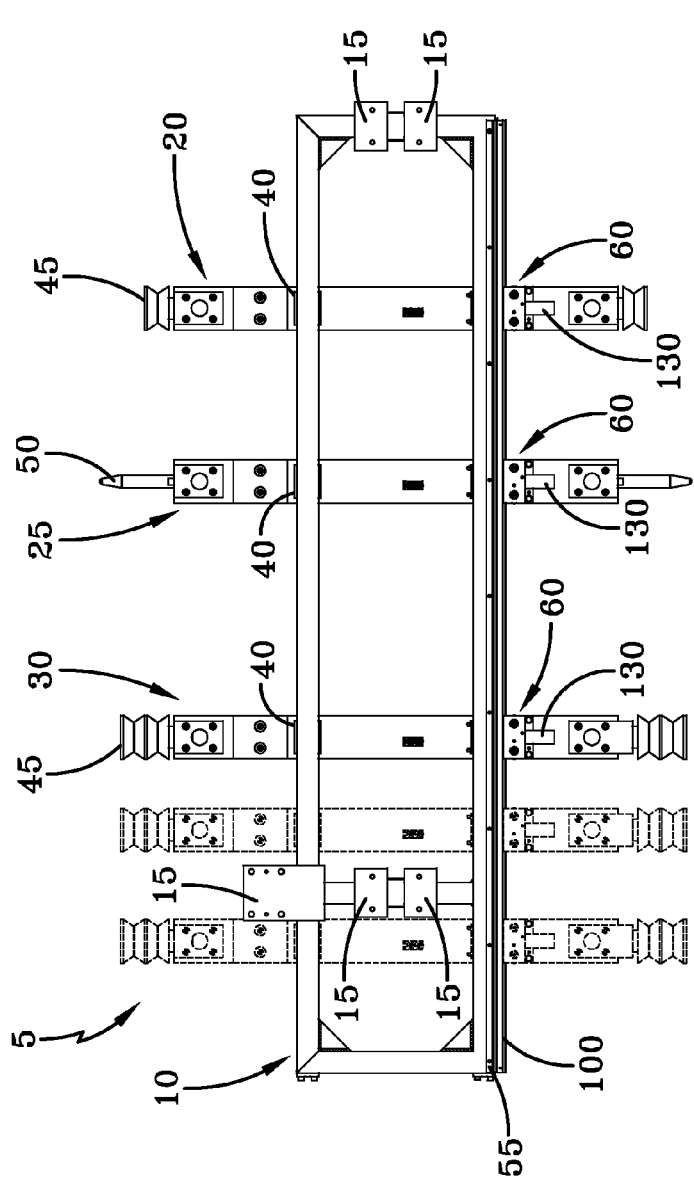
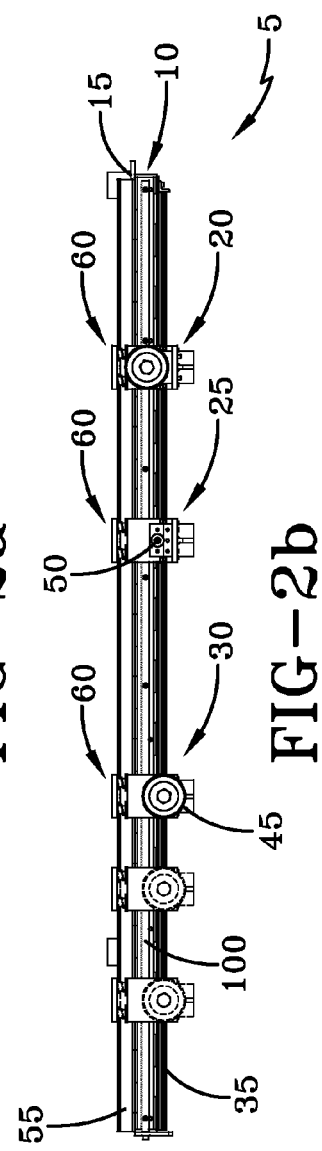

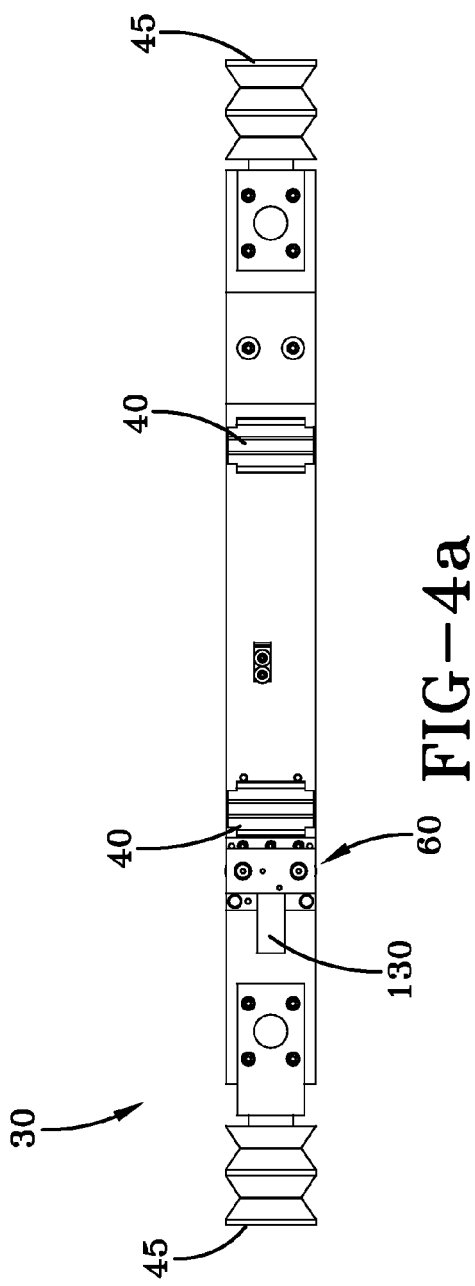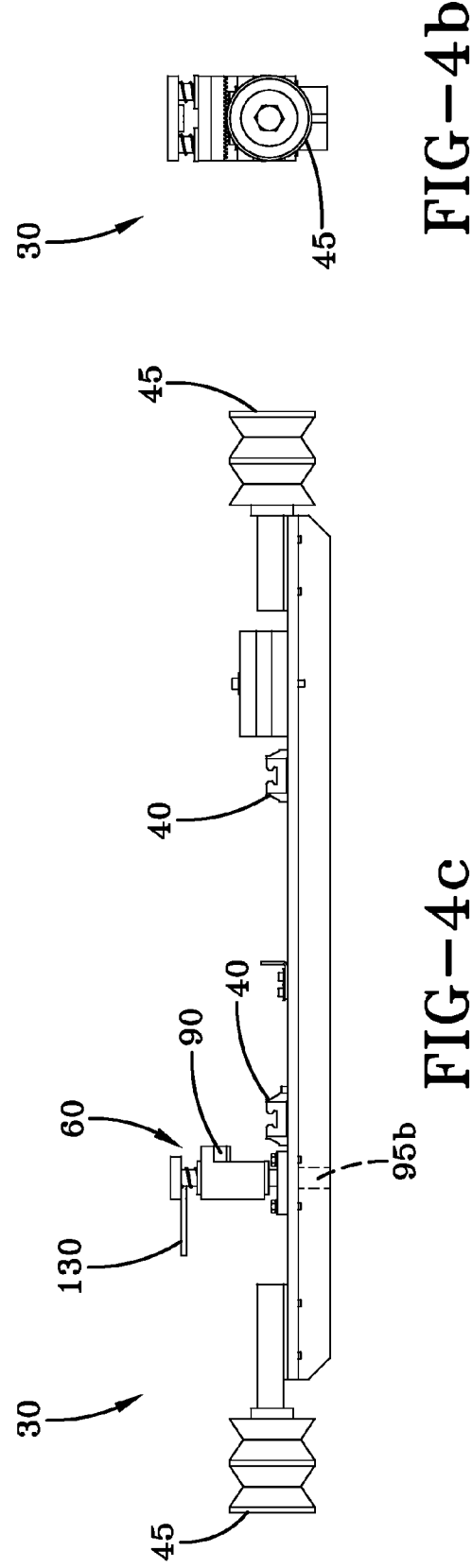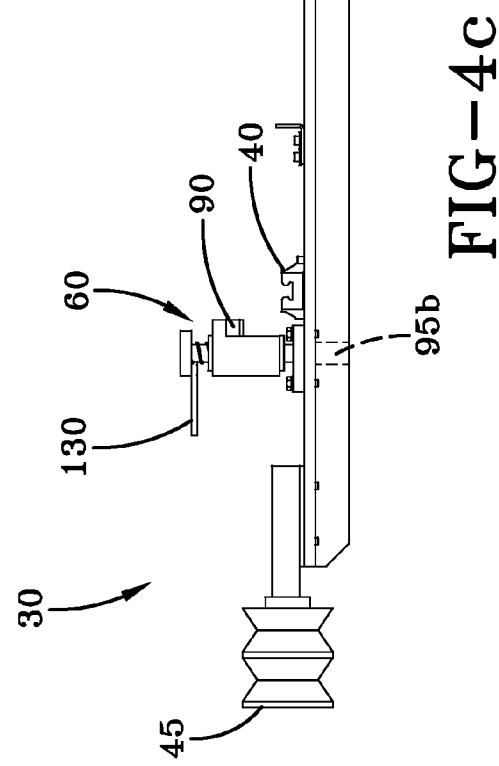

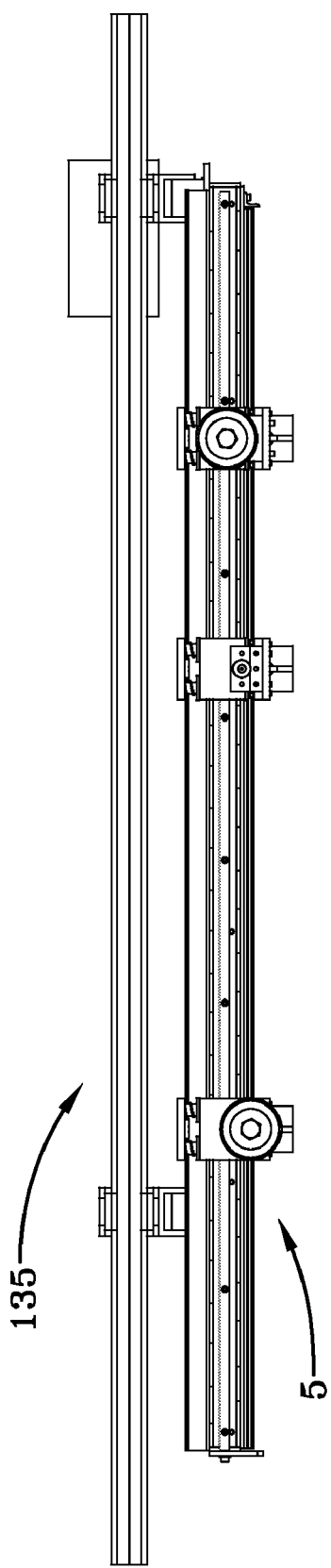
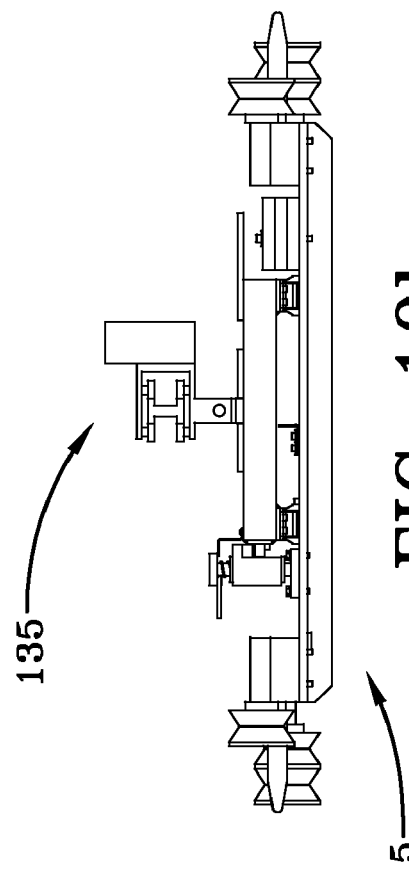
FIG-10a
FIG-10b

FLEXIBLE CONVEYOR CARRIER FIXTURE FOR PART TRANSPORT AND METHOD OF USE THEREOF

BACKGROUND OF THE INVENTION

The present invention is directed to a carrier fixture for supporting body side panels during their transport along an assembly line. More particularly, the present invention is directed to a flexible carrier fixture that is capable of supporting a number of dissimilar body side panels during their transport along an assembly line by an overhead conveyor.

In manufacturing, particularly large-scale manufacturing, various components that make up an assembled apparatus are often transported along an assembly line. Such transport may occur simply by workers transporting such components by hand from one assembly line station to another. In larger or more complex manufacturing operations, however, such transportation of components is more typically accomplished by means of one or more conveyor lines. These conveyor lines may be of the floor mounted or overhead variety, or a combination thereof.

As manufacturing becomes more and more streamlined, manufacturers are increasingly attempting to build more than one product on a single assembly line. For example, automotive manufacturers desire to assemble dissimilar vehicles on the same assembly line and have, therefore, designed chassis and other components that can be used interchangeably in this manner.

It should be realized, however, that in the case of complex products such as automobiles and others, there will be a number of components that are unique to a particular model. In some cases, the number and/or significance of dissimilar components may be minimal, while in other cases, the number and/or significance of dissimilar components may be substantial. It is not hard to imagine that in the case of an automobile, for example, a significant number of components will be model specific.

Whatever the product in question, if dissimilar components are to be used, they must be moved along the assembly line. For example, the manufacturing of different automobile models on the same assembly line generally means that dissimilar parts such as engines, transmissions, suspension components, body panels, interior components, etc., must be transported along some portion of the assembly line. In order to maximize the efficiency of the assembly process, it is important that such components can be transported with as little change to the transport system (e.g., conveyor) as possible.

When assembling more than one model of automobile, it can be easily understood that at least certain dissimilar body panels are likely to be employed. This seems to be particularly true for body side panels. That is, where there instances in which two or more vehicles may share a hood or a trunk, for example, body side panels tend to be unique to a particular vehicle. Thus, when assembling more than one vehicle on the same assembly line, it is required that two or more different body side panels be transported by the same conveyor system. This poses a challenge both because there are generally only limited locations at/by which such panels can be supported, and because body side panels can be of significantly different shape and/or size. This problem is, of course, exacerbated when the vehicles being assembled on the same assembly line are significantly different—such when the product mix includes, for example, an SUV and a compact car.

Consequently, as much vehicle manufacturing processes become more flexible, there is a need for an apparatus that is capable of transporting dissimilar body side panels along the same assembly line without requiring time consuming and/or complicated modification when switching from one model to another. It is such an apparatus to which the present invention is directed.

SUMMARY OF THE INVENTION

The present invention is directed to a flexible conveyor carrier that is capable of transporting a number of dissimilar vehicle body panels along a conveyor. While it is contemplated that the concept of the present invention can be applied to the transport of a number of different body panels, the exemplary embodiment described herein is directed specifically to the transport of body side panels. However, whatever the body panels of interest, the setup of the associated carrier of the present invention may be quickly and easily converted from one model of body panel to another.

In the below-described exemplary embodiments of the present invention, the flexible carrier fixture is designed to transport body side panels along an overhead conveyor system. As such, the flexible carrier fixture includes a carrier frame that is adapted to be coupled to and ride beneath an overhead conveyor.

A number of cross-rails are associated with the carrier frame. At least certain of the cross-rails have hangers at their ends for supporting and locating body panels of interest. One or more of the cross-rails can preferably also be moved along the length of the carrier frame. To facilitate such movement, the moveable cross-rails are preferably attached to a linear guide system, such as linear guide blocks riding on associated guide rails that affixed to the carrier frame.

It is desirable that a moveable cross-rail can be repeatedly located to various supporting locations along the length of the carrier frame. It is also desirable that a moveable cross-rail can be secured in a desired supporting location along the length of the cross-rail once moved thereto. As such, a gear rack is also preferably attached to each carrier frame and extends some distance along its length. A locking device (described in detail below) can then be attached to a moveable cross-rail, whereby the locking device can be released to allow for movement of the cross-rail, and subsequently engaged with the gear rack to lock the cross-rail into the desired position.

Preferably, but not necessarily, the locking device is adapted to be operated, and the cross-rails are adapted for movement along the carrier frame, by an automated device such as a robot. In the exemplary embodiment shown in the drawing figures and described in more detail below, the locking device of the present invention is released by robotic insertion of a pin thereto. Subsequent to release of the locking device, the robot can move the associated moveable cross-rail to a desired position along the carrier frame, and release the locking device—thereby securing the cross-rail in its new position.

While not essential to operation of a flexible conveyor carrier of the present invention, a robot can be highly beneficial to a carrier changeover process. For example, when the setup of a number of conveyor carriers needs to be changed in order to accommodate a different body side panel, a robot can automatically change the setup as each carrier passes its location. The robot may be dedicated to carrier changeover, or a robot that also performs another function may be utilized.

Each body side panel to be transported by a flexible conveyor carrier of the present invention will have a number of support points associated therewith. These support points will coincide with particular cross-rail locations along the carrier frame—the cross-rail locations placing the associated hangers in correct position to support the corresponding body side panel at the designated support points. The proper cross-rail location for each body side panel may be marked or otherwise indicated on the flexible conveyor carrier.

BRIEF DESCRIPTION OF THE DRAWINGS

In addition to the features mentioned above, other aspects of the present invention will be readily apparent from the following descriptions of the drawings and exemplary embodiments, wherein like reference numerals across the several views refer to identical or equivalent features, and wherein:

FIG. 2a is a top view of the carrier fixture of FIG. 1;

FIG. 2b is a side view of the carrier fixture of FIG. 1;

FIG. 2c is a front view of the carrier fixture of FIG. 1;

FIG. 3b is a side view of the adjustable front cross-rail of FIG. 3a;

FIG. 4a is a top view of an adjustable rear cross-rail of the carrier fixture of FIG. 1;

FIG. 4b is a side view of the adjustable rear cross-rail of FIG. 4a;

FIG. 4c is a front view of the adjustable rear cross-rail of FIGS. 4a-4b;

FIG. 5b is a side view of the adjustable center cross-rail of FIG. 5a;

FIG. 7b is a side view of the cross-rail retention mechanism of FIGS. 6-7a;

FIG. 10a is a side view showing the carrier fixture of FIG. 1 suspended from an overhead conveyor;

FIG. 10b is a front view of the suspended carrier fixture of FIG. 10a;

DETAILED DESCRIPTION OF THE EXEMPLARY EMBODIMENT(S)

Figure 9B:
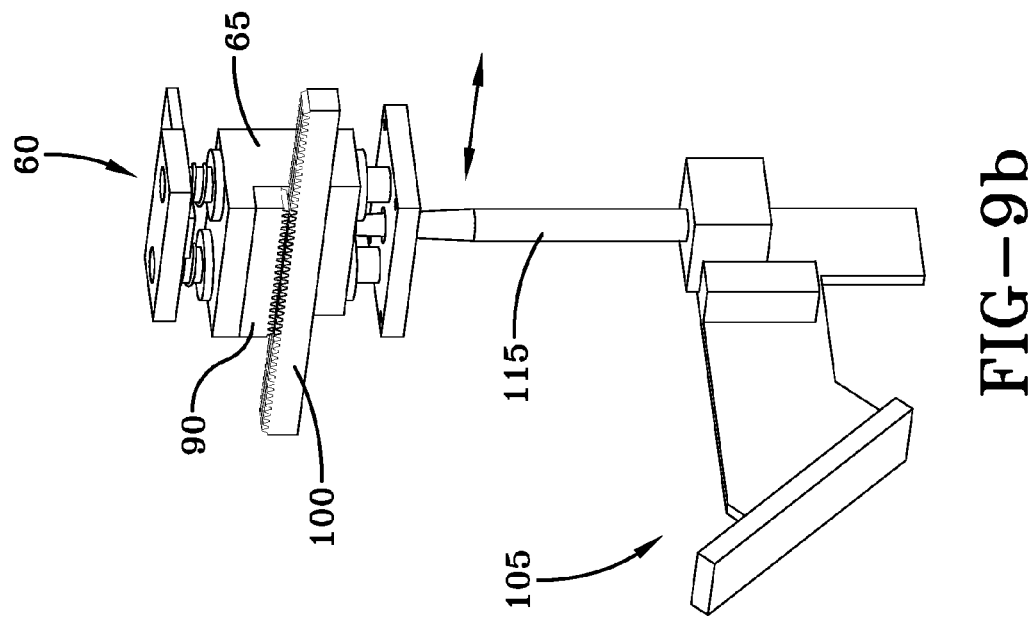
FIG. 9b shows the end effector of FIG. 8 holding the cross-rail retention mechanism of FIGS. 6-7b in a disengaged position, wherein the cross-rail retention mechanism and cross-rail (not shown) with which it is associated may be repositioned by the robot (not shown) to which the end effector is attached.

One exemplary embodiment of a flexible conveyor carrier fixture (carrier fixture) 5 of the present invention is shown in FIGS. 1 and 2a-2c. This particular embodiment of the carrier fixture 5 is designed to work in conjunction with an overhead conveyor system 135 (see FIGS. 9a-9b). This embodiment of the carrier fixture 5 is also designed to carry parts on both sides thereof, although single-sided carrier fixtures are also well within the scope of the present invention.

The carrier fixture 5 includes a frame 10, the exact shape and size of which may change based on the body panels to be transported, the overhead conveyor system in use, etc. A number of mounting pads 15 are mounted or otherwise connected to the frame 10 for attachment of the carrier fixture 5 to the overhead conveyor 135.

In the exemplary embodiment shown, the carrier fixture 5 is of substantially rectangular shape, with its length extending in the direction of conveyor travel, as indicated by the arrow T. A number of moveable cross-rails may be associated with each carrier fixture 5. The number and type of cross-rails may vary by application. In this case, the carrier fixture 5 includes a front cross-rail 20, a center cross-rail 25 and a rear cross-rail 30. The cross-rails 20, 25, 30 are used in combination to support and locate various body side panels (see FIGS. 11-14) as they are transported along an assembly line by the overhead conveyor 135.

As can be best understood by reference to FIGS. 11-14, each body side panel to be transported using the carrier fixture 5 has unique support points by which it can be supported and transported in a balanced and properly oriented position. Consequently, one or more of the cross-rails 20, 25, 30 are preferably moveable along the length of the frame 10 so as to accommodate body side panels of different size and shape. Allowing one or more of the cross-rails 20, 25, 30 to move along the length of the frame 10 increases the number of potential support locations by which a body side panel can be supported—thereby improving the flexibility of the carrier fixture 5. In this particular embodiment of the carrier fixture 5, all of the cross-rails 20, 25, 30 are moveable. Other moveable cross-rail combinations are obviously also possible. For example, the rear cross-rail 30 and center cross-rail 25 may be moveable, while the front cross-rail is fixed.

Figure 1:
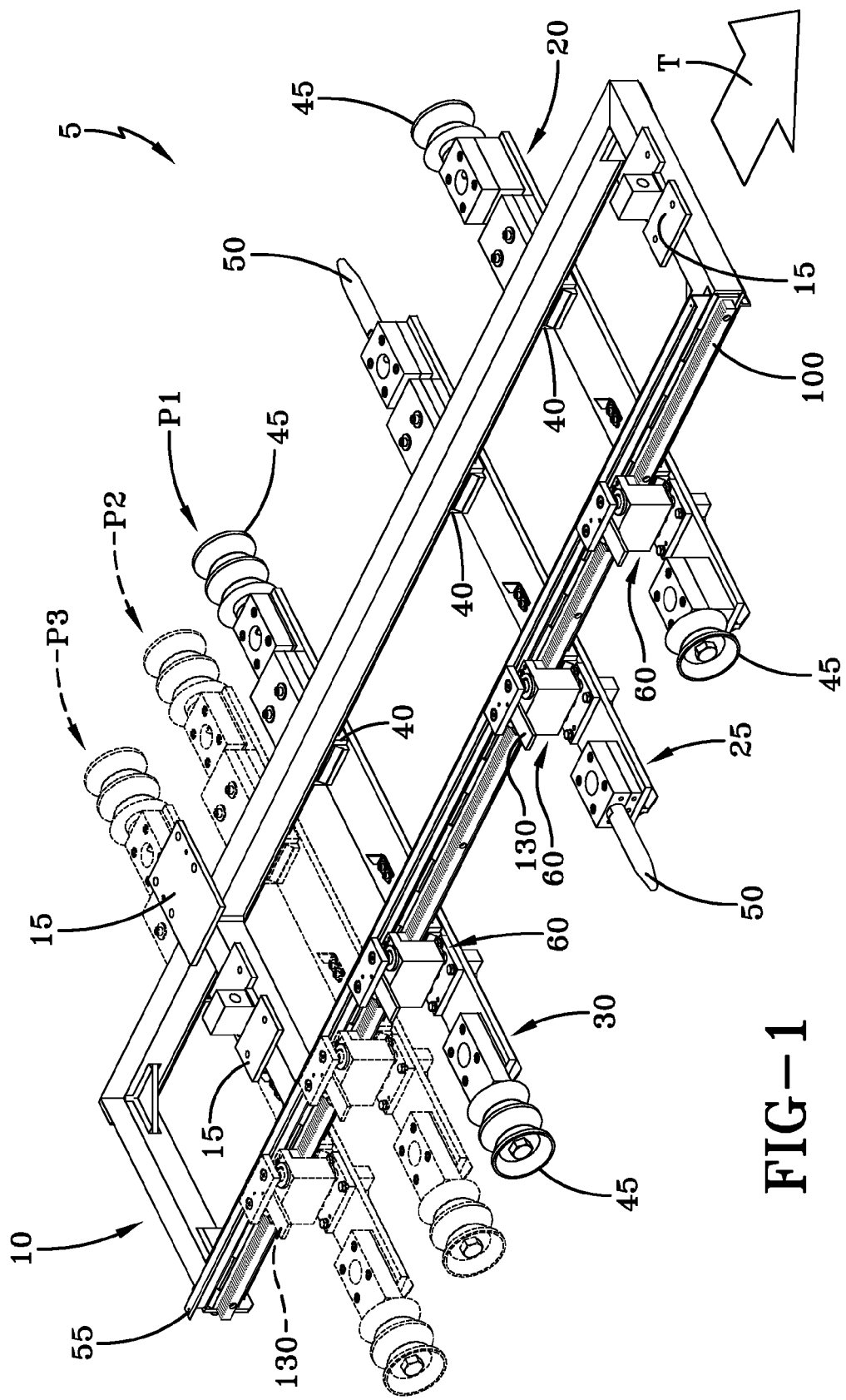
FIG. 1 is a perspective view of an exemplary embodiment of an assembled flexible conveyor carrier fixture of the present invention.
Figure 3B:
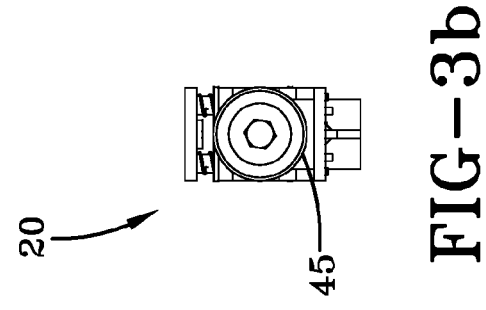
Figure 3A:
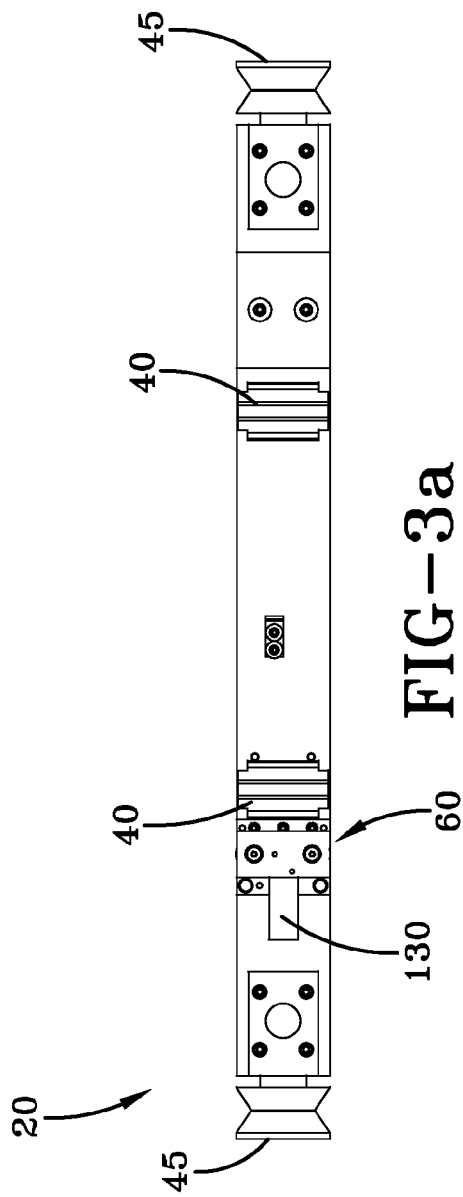
FIG. 3a is a top view of an adjustable front cross-rail of the carrier fixture of FIG. 1.
Figure 3C:
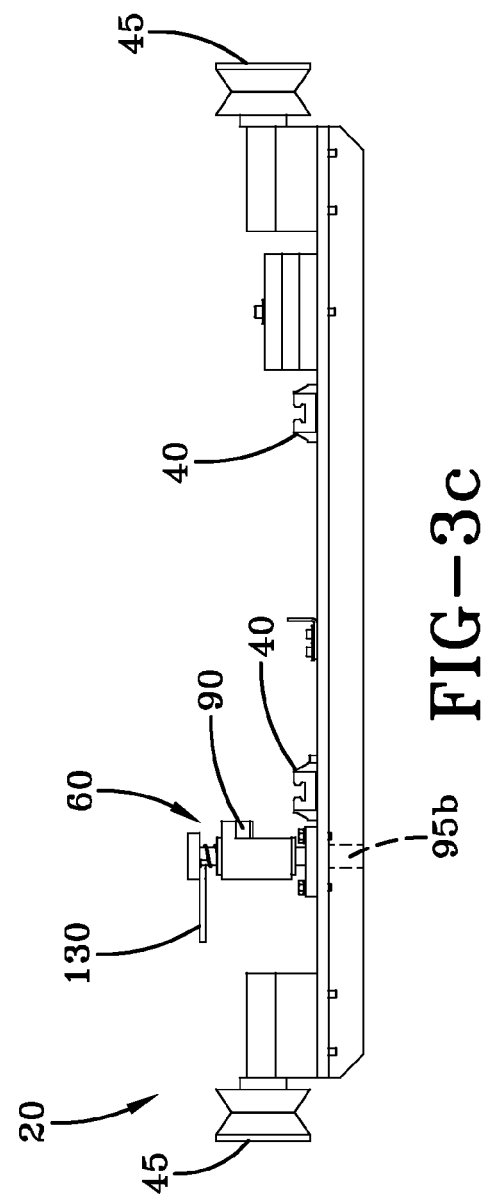
FIG. 3c is a front view of the adjustable front cross-rail of FIGS. 3a-3b.
Figure 5B:
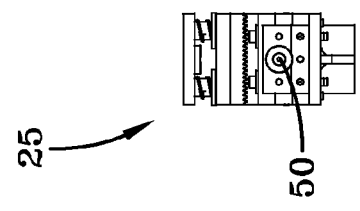
Figure 5A:
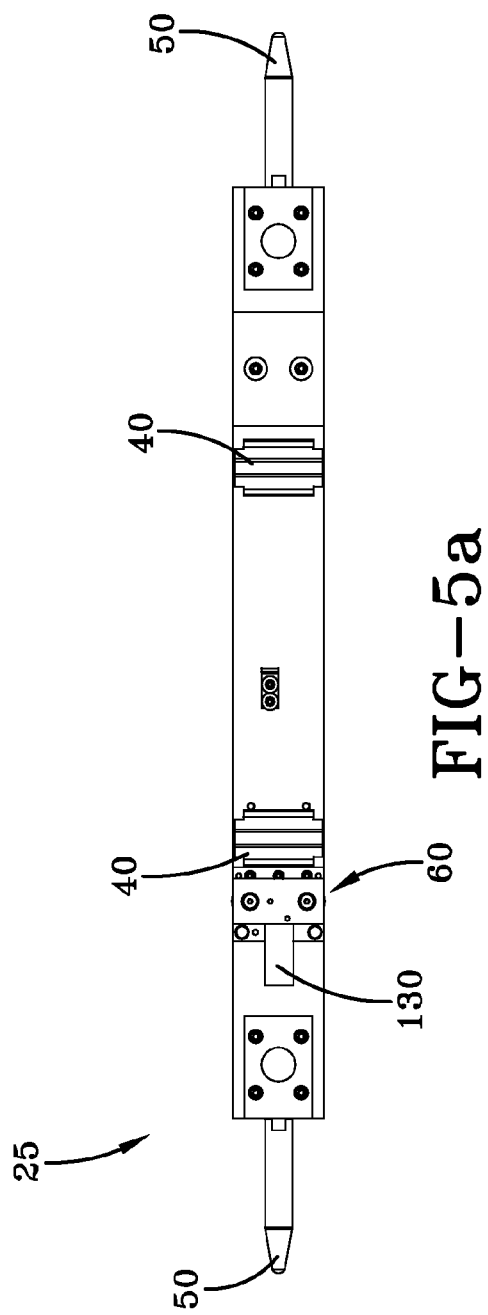
FIG. 5a is a top view of an adjustable center cross-rail of the carrier fixture of FIG. 1.
Figure 5C:
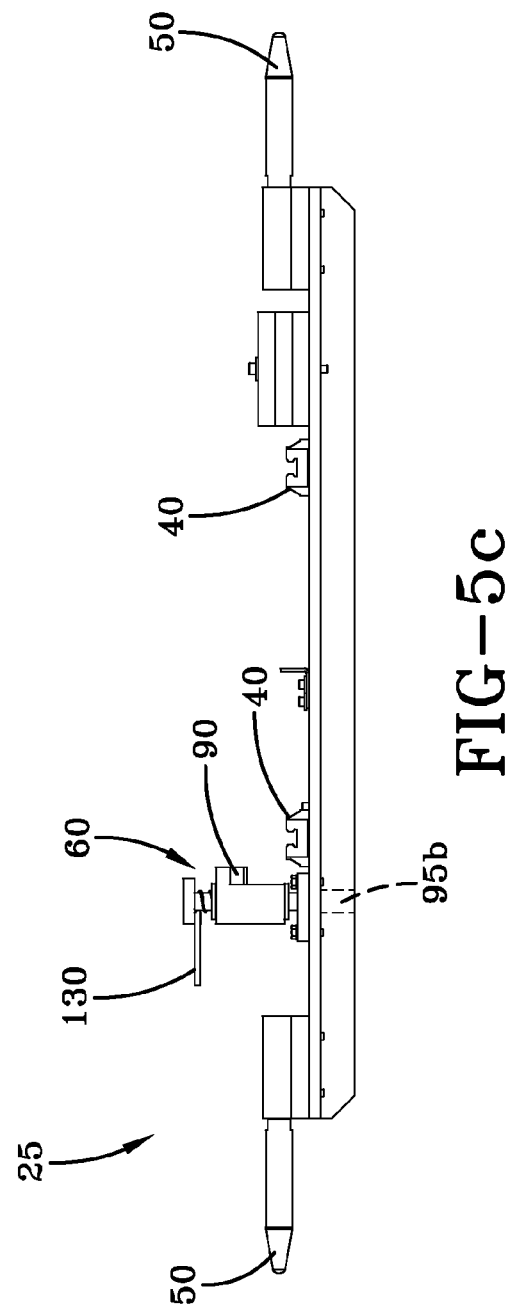
FIG. 5c is a front view of the adjustable center cross-rail of FIGS. 5a-5b.
Figure 11:
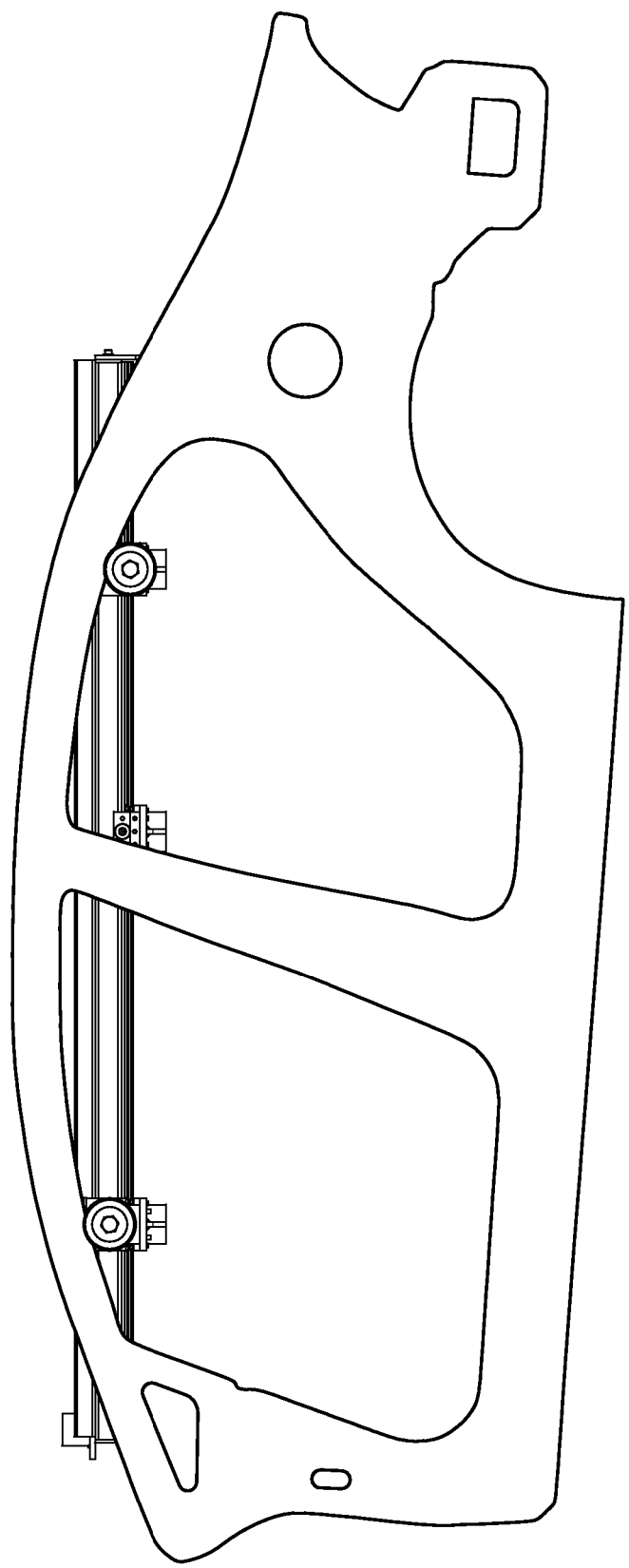
FIG. 11 illustrates a first body side panel in a supported position on one side of the carrier fixture of FIG. 1.
Figure 12:
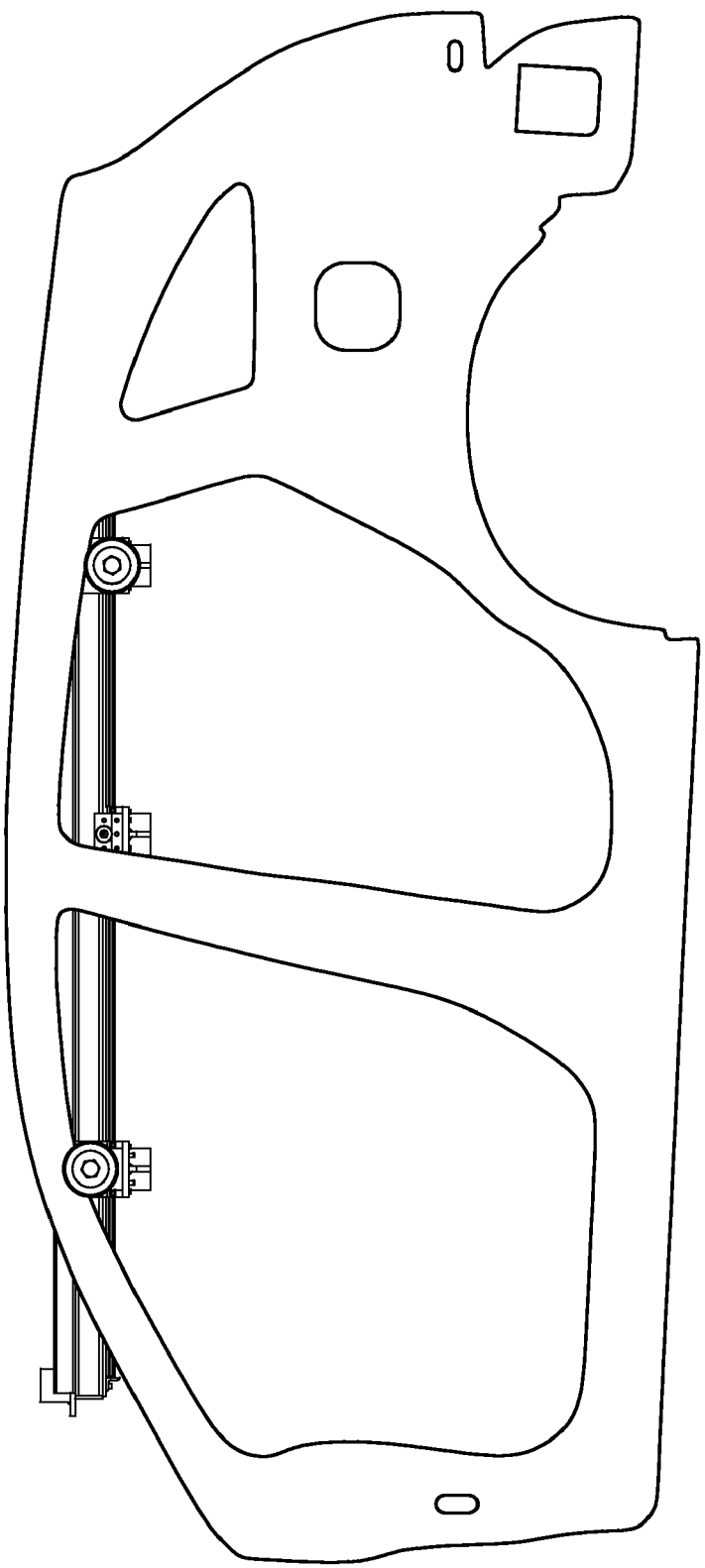
FIG. 12 illustrates a second body side panel in a supported position on one side of the carrier fixture of FIG. 1.
Figure 13:
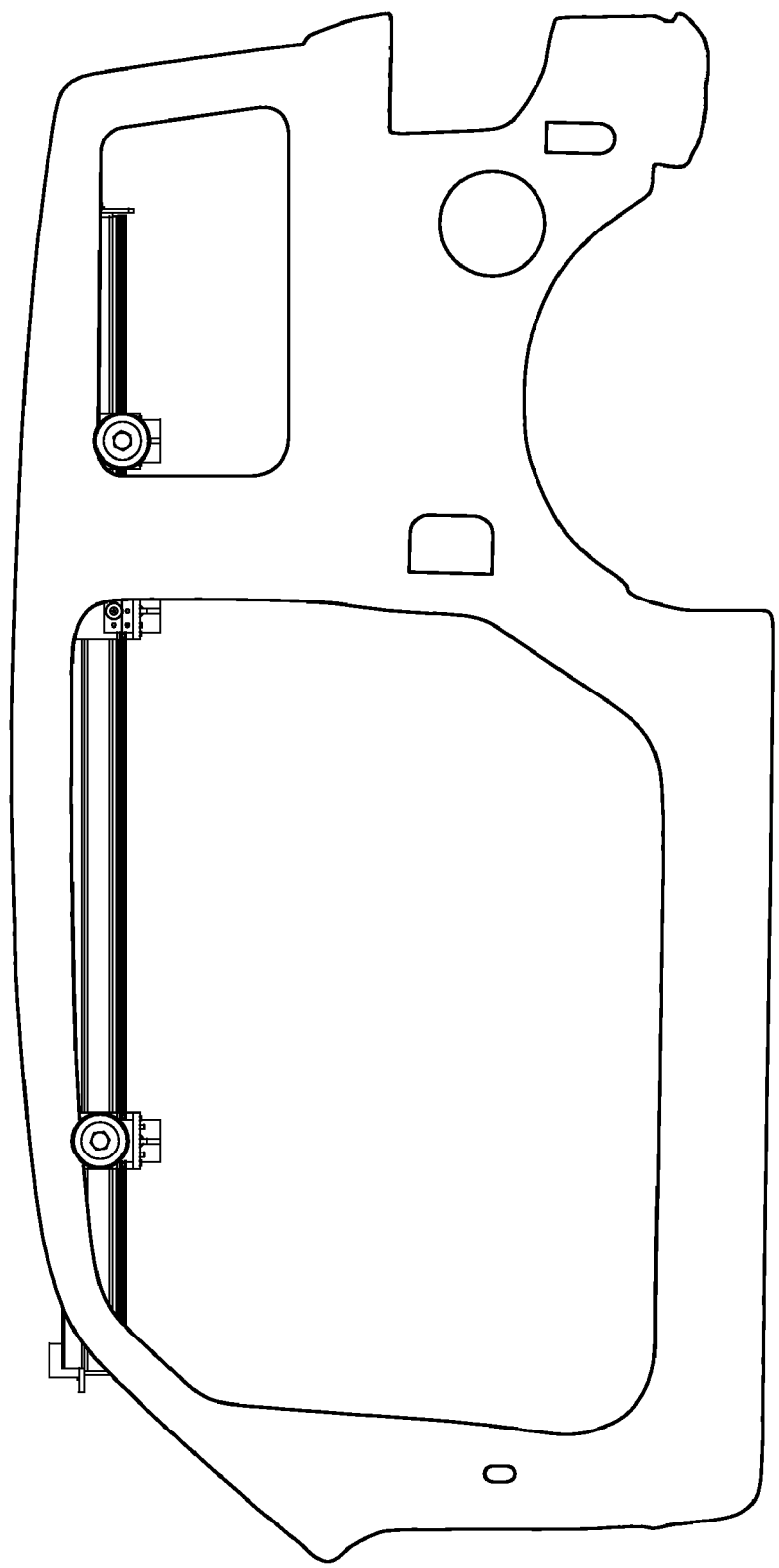
FIG. 13 illustrates a third body side panel in a supported position on one side of the carrier fixture of FIG. 1.
Figure 14:
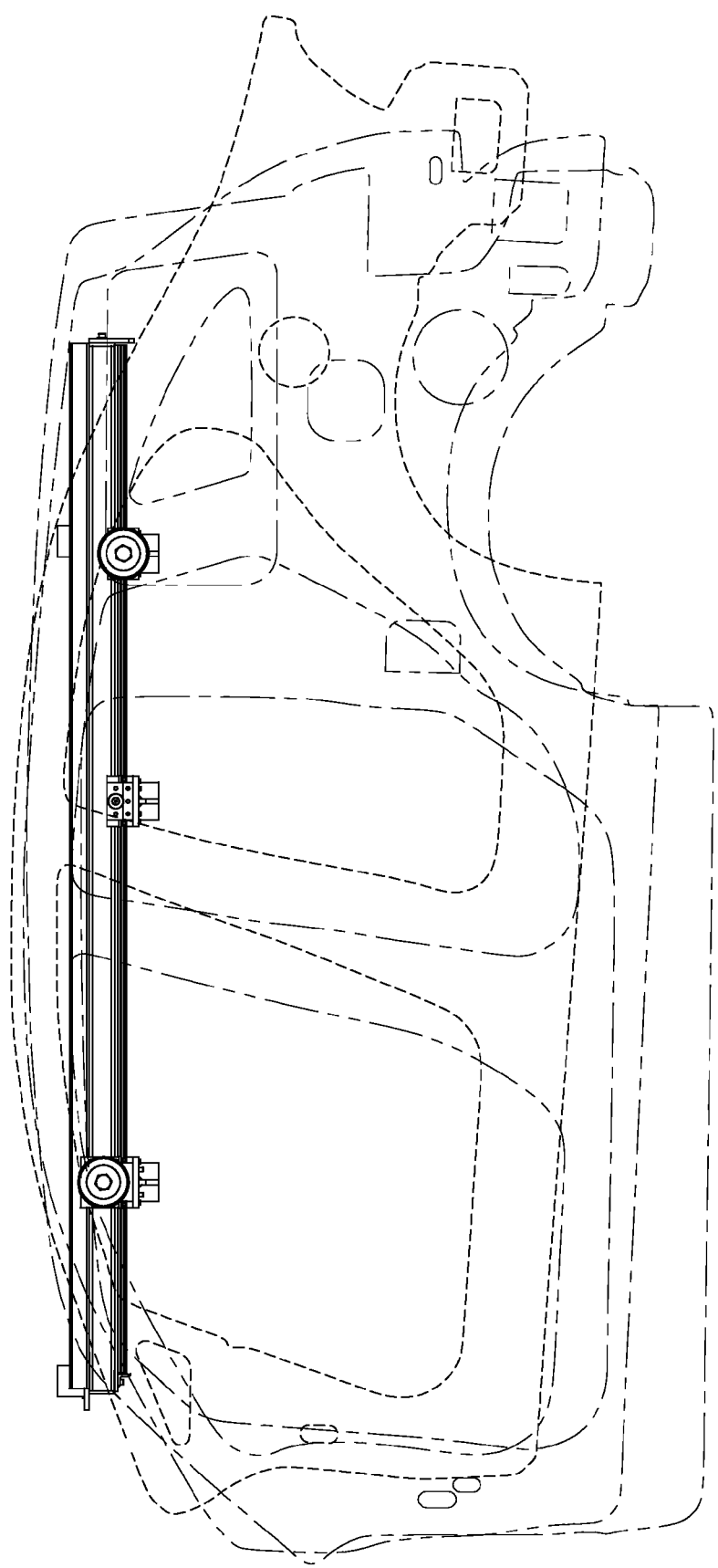
FIG. 14 is an overlay simultaneously illustrating the body side panels of FIGS. 11-13 in a supported position on one side of the carrier fixture of FIG. 1.

Movement of the rear cross-rail 30 along the frame 10 is illustrated in FIG. 1. As shown, the rear cross-rail 30 resides in a first position $P_1$ that coincides with the proper support position for the body panel shown in FIG. 12. Rear cross-rail 30 positions for the body panels shown in FIG. 11 and FIG. 13 are also represented in phantom in FIG. 1 and designated as $P_2$ and $P_3$, respectively. Obviously, many other rear cross-rail positions may also exist to coincide with other body panels.

To facilitate movement of the cross-rails 20, 25, 30 along the frame 10, the cross-rails are preferably connected to the frame by a linear guide means. Various linear guide means may be effectively used for this purpose, and such linear guide means would be familiar to one skilled in the art. In the particular embodiment of the carrier fixture 5 shown and described, the linear guide means comprises a pair of linear guide rails 35 attached to the frame 10 and extending along its length, and a corresponding pair of guide blocks 40 attached to each cross-rail 20, 25, 30 for engaging the guide rails. While other methods of directing the movement of the cross-rails 20, 25, 30 may be possible, use of such linear guide means allows for smooth and controlled movement thereof.

In this particular embodiment of the carrier fixture 5, the guide rails 35 are shown to be mounted to the underside of the frame 10, such that the cross-rails 20, 25, 30 are suspended (at least partially) therefrom by the guide blocks 40. It should be realized, however, that it is also possible, and within the scope of the present invention, to locate the guide rails 35 to the top or sides of the frame. In the former case, the cross-rails 20, 25, 30 would then reside above the frame 10. In the latter case, the cross-rails 20, 25, 30 could reside either above or below the frame 10 with the guide blocks 40 connected thereto by angled brackets, etc.

The cross-rails 20, 25, 30 may be equipped with various devices that assist in supporting and/or locating the different body side panels to be transported. For example, the front and rear cross-rails 20, 30 of this particular embodiment of the carrier fixture 5 are provided with hangers 45 that act to support the various body side panels in a suspended position. Various numbers of such hangers may be associated with a given cross-rail. For example, as shown herein, the front cross-rail 20 uses a single hanger 45, while the rear cross-rail employs a double hanger or an abutting pair of hangers. A multitude of other combinations are also possible.

Because this particular carrier fixture 5 is designed to support thin body side panels along an edge thereof, each hanger 45 is designed substantially as a grooved wheel, which may or may not rotate. This design facilitates support and retention of the body side panels that the carrier fixture 5 is designed to transport. This design also allows for highly accurate and repeatable location of the body side panels with respect to the carrier fixture 5. As would be obvious to one skilled in the art, however, hangers of the present invention can be of virtually any size, shape and material that operates to best support, retain and/or locate a part to be transported by the associated carrier fixture.

As shown, each end of the center cross-rail 25 of this embodiment of the carrier fixture 5 is fitted with a position adjusting/setting element 50 that differs from the hangers 45 of the front and rear cross-rails 20, 30. In this embodiment, the element 50 is a pin that is used to set the position of a body side panel relative to the length of the carrier fixture 5. As such, the center cross-rail 25 can be used in this embodiment to adjust/set the position of a body side panel along the length of the frame 10. This is accomplished, as can be best observed in FIGS. 11-13, by contacting the pin 50 against a portion of the body side panel, such as a door pillar. The use of a pin 50 or similar element can also help to prevent a body side panel from sliding forward or rearward along the length of the carrier fixture 5 during movement of the overhead conveyor.

It may also be possible to properly locate a body side panel without the use of a center cross-rail 25 or without providing a position adjusting/setting element on the center cross-rail. For example, depending on the shape of the body side panel, proper location thereof may be achieved with only the front and rear cross-rails 20, 30 and their respective hangers 45. Alternatively, a center cross-rail 25 may be present but fitted with a hanger of the same or similar type as the hangers on the front and rear cross-rails 20, 30. It has been found, however, that the combination of a front and rear cross-rail 20, 30 with supporting hangers 45 and a center cross-rail 25 with position adjusting/setting element 50 is very capable of accurately and repeatably supporting and properly locating various body side panels to a carrier fixture 5.

The location and orientation of a component supplied to a manufacturing process can be very important. For example, in the exemplary embodiment shown and described herein, the carrier fixture 5 transports body side panels from a forming area to an area where they will be welded to the other vehicle components. Frequently, the body side panels are robotically removed from the carrier fixture 5 and placed onto weld jigs. Thus, for this reason and others, being able to consistently locate a body side panel on the carrier can be quite beneficial.

Therefore, it can be understood that once the proper position of each cross-rail 20, 25, 30 has been determined with respect to a particular body side panel, it is desirable that the cross-rails can be easily returned to said positions the next time the same body side panel is to be transported by the carrier fixture 5. To this end, it is preferable that some means of assuring the repeatable and secure repositioning of any moveable cross-rails is provided.

Proper positioning of the cross-rails 20, 25, 30 with respect to a given body side panel can be determined in a number of ways—such as electronically or manually. For example, if electronic models of both the carrier fixture 5 and a body side panel of interest are available, it is possible to graphically determine the proper position for each of the cross-rails 20, 25, 30. Alternatively, proper positioning of the cross-rails 20, 25, 30 may be determined manually—by supporting a body side panel of interest from the hangers 45 and adjusting the position of the cross-rails until the body side panel is acceptably located and oriented.

In order to assure that subsequent repositioning of the cross-rails 20, 25, 30 can be quickly and easily achieved, it is preferable that the position determined as proper for each cross-rail be definable with respect to the carrier fixture 5 or some other reference point. In this exemplary embodiment of the carrier fixture 5, a scale 55 is affixed to the frame 10 so that the position of each cross-rail 20, 25, 30 can be defined as a distance. For example, proper positioning of a cross-rail may be defined as a numerical value, which may correspond, for example, to some distance from a zero point on the scale 55. It is also possible to set the position of one cross-rail and then locate the other cross-rail(s) at some distance from the first cross-rail or another intervening cross-rail.

When a scale is employed, each cross-rail 20, 25, 30 is preferably provided with a pointer or some other indicator that accurately specifies its location along the scale 50. A list of the proper positions of each cross-rail 20, 25, 30 for various body side panels can be maintained so that changing the setup of the carrier fixture 5 is simplified. Alternatively, and as described in more detail below, a robot or other manipulator can be provided with the positional data associated with each cross-rail 20, 25, 30 for a given body side panel, and used to move each cross-rail to the proper position during a setup change.

Certainly, other methods of indicating proper cross-rail position are also possible, and such are considered to be within the scope of the present invention. For example, proper cross-rail position for various body side panels may be indicated by placing marks or tags of different color on the carrier fixture 5. Similarly, alphanumeric indicators may be provided on the carrier fixture 5 for positioning purposes. Such indicators may be placed or attached to the frame 10 or elsewhere. It is also contemplated that in yet other and more complex embodiments, proximity switches or similar sensors may be used to indicate when a cross-rail is in proper position for a given body side panel. A similar result may be achieved via non-contact means, such as through the use of laser or other light-emitting emitters/receivers (whether attached to or separate from the carrier fixture 5) that interact to indicate proper cross-rail position for a given body side panel. Other techniques would also be apparent to one skilled in the art.

Once a cross-rail is moved to a particular position, it is preferable that the cross-rail can be securely and accurately retained in that position until it is desired that the cross-rail be moved. To this end, at least one, and preferably each, of the moveable cross-rails of a carrier fixture of the present invention, is equipped with a retention mechanism capable of effectively maintaining the position of the cross-rail with which it is associated. An exemplary retention mechanism 60 is shown to be attached to each of the cross-rails 20, 25, 30 in FIGS. 1-5, and is depicted in more detail in FIGS. 6-7.

The retention mechanism 60 employed in the exemplary embodiment of the carrier fixture 5 of the present invention accomplishes cross-rail retention by causing the engagement of gear teeth. More specifically, the retention mechanism 60 includes a spring-loaded and substantially rigid clamping body 65 that is mounted to a corresponding cross-rail such that in its normal position, a gear rack segment 90 associated with the clamping body engages a like gear rack 100 associated with the frame 10.

Figure 6:
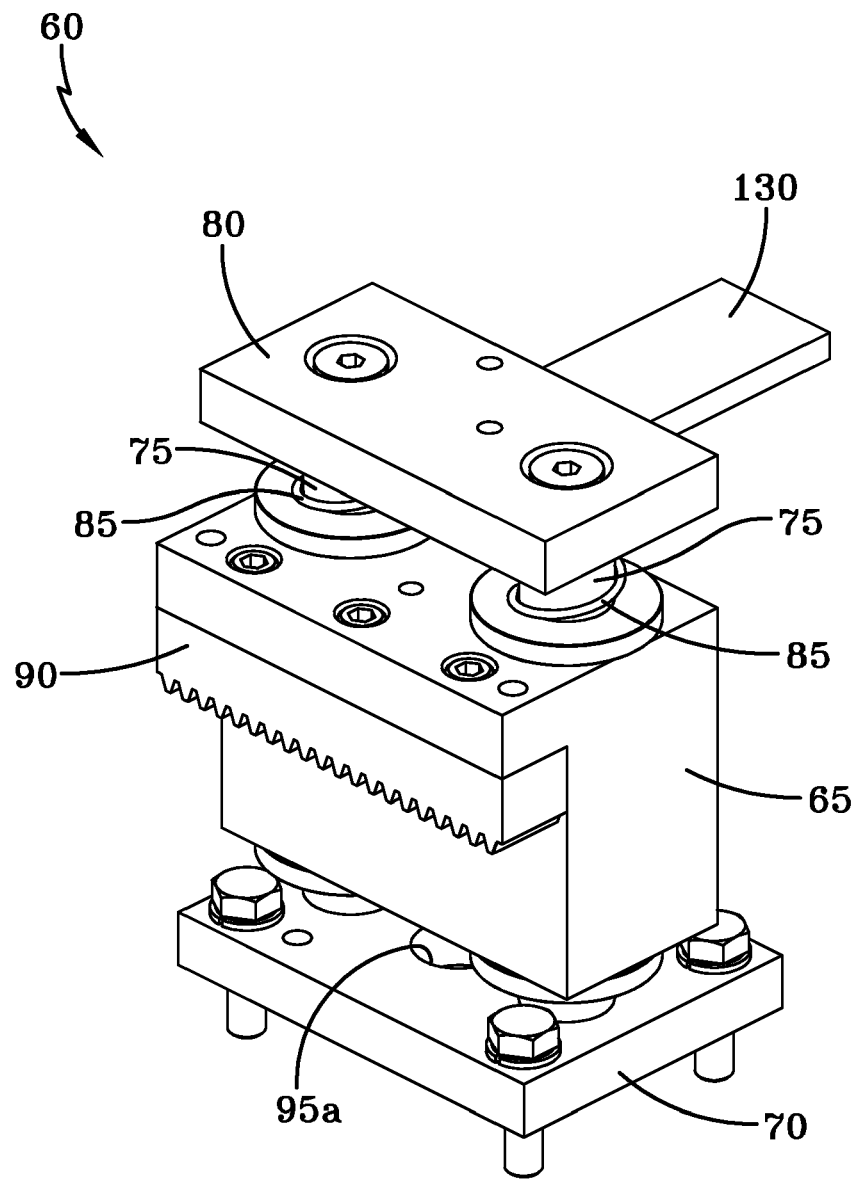
FIG. 6 is an enlarged perspective view of a cross-rail retention mechanism of the carrier fixture of FIG. 1.
Figure 7A:
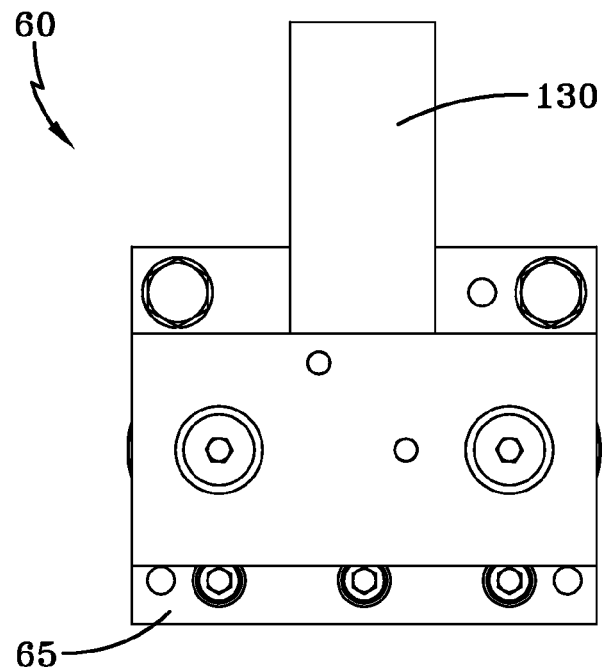
FIG. 7a is a top view of the cross-rail retention mechanism of FIG. 6.
Figure 7B:
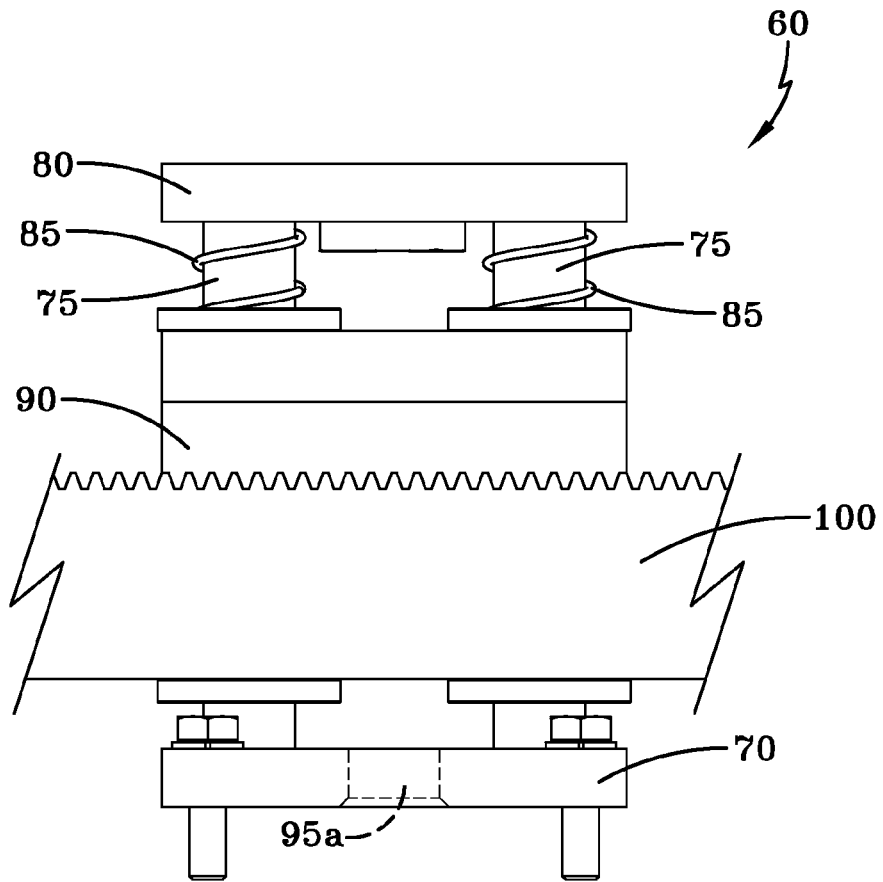

As can be seen in detail in FIGS. 6-7, the clamping body 65 may be mounted to a cross-rail via a mounting plate 70. Alternatively, the cross-rail may serve as the mounting plate for the clamping body 65. As shown, a pair of guide shafts 75 extend from the mounting plate 70 upward through the clamping body 65. The opposite ends of the guide shafts 75 are secured by a keeper plate 80. Use of the guide shafts 75 allows for controlled vertical movement of the clamping body 65.

Preferably, the clamping body 65 is biased when in its normal position such that the gear rack segment 90 affixed thereto is engaged with the gear rack 100 attached to the frame 10. To this end, at least one spring and, in this case, a pair of springs 85, is preferably disposed between the keeper plate 80 and the top of the clamping body 65 to encourage engagement of the gear rack segment 90 and gear rack 100. In this embodiment, the springs 85 surround the guide shafts 75, although other spring mounting methods may also be used.

Because the retention mechanisms 60 are normally in an engaged position, movement of a cross-rail 20, 25, 30 first requires disengagement of its associated retention device. This is accomplished by inserting a releasing element through a retention mechanism access hole 95a located in the mounting plate 70 (or the cross-rail if it serves as the mounting plate) and moving the clamping body 65 along the guide rods 75 and away from the gear rack 100. With the retention mechanism 60 maintained in a disengaged state, the associated cross-rail can then be repositioned along the length of the frame 10. Once the cross-rail is properly positioned, the retention mechanism 60 is allowed to return to its normal, biased position, and the cross-rail is subsequently held in place by engagement of the gear rack segment 90 with the gear rack 100.

It would be understood by one skilled in the art that the accuracy or exactness with which a cross-rail can be located when using the retention mechanism 60 described above will depend on the pitch of the teeth on the mating gear racks 90, 100. Consequently, it is contemplated that gear racks of different tooth pitch may be employed depending on the accuracy with which the cross-rails must be located (i.e., a smaller tooth pitch will allow for adjustment of cross-rail position in smaller increments).

In this particular embodiment of the carrier fixture 5, the retention mechanisms 60 are shown to extend upward from their associated cross-rails 20, 25, 30 to engage a gear rack 100 mounted to the exterior side of the frame 10. However, it is certainly possible for the retention mechanisms 60 to be differently arranged. For example, the gear rack may be attached to an interior side of the frame 10, with the retention mechanisms appropriately located for proper engagement therewith. Alternatively, the gear rack may be attached to a top or bottom surface of the frame 10, with the retention mechanisms 60 appropriately oriented and located for proper engagement therewith.

Further, while the shown and described method of cross-rail retention works particularly well, it is also contemplated that other means of cross-rail retention may also be employed. For example, it may be possible to use a retention mechanism similar to that shown, but without the spring biasing feature. In such a case, engagement of the gear racks may be achieved via gravity. In another embodiment, the gear racks of the retention mechanism may be replaced with blocks, etc., of high-friction materials that resist sliding. Other powered and non-powered clamping devices that grip the frame 10, the linear rails 35 or some other part of the carrier fixture 5 may also be substituted, and such devices would be familiar to one skilled in the art.

With respect to the retention mechanism 60 employed with this particular embodiment of the carrier fixture 5, disengagement is achieved by using a releasing element to forcibly move the clamping body 65 away from the gear rack 100. In addition to the retention mechanism access hole 95a provided in the mounting plate 70 of the retention mechanism 60, a corresponding retention mechanism access hole 95b is also located in each cross-rail having a retention mechanism 60. When the retention mechanism 60 is properly positioned on its respective cross-rail, the retention mechanism access holes 95a, 95b are aligned to allow the releasing element to contact the bottom of the clamping body 65.

The releasing element can be of various design and composition. For example, the releasing element may be a metallic rod or pin that permits a user to move the clamping body 65 away from the gear rack 100 against the force of the biasing springs 85. Alternatively, and more preferably, however, disengagement of the retention mechanisms 60 and positioning of the cross-rails 20, 25, 30 of the carrier fixture 5 is performed by automated equipment—and even more preferably, robotically.

Figure 8:
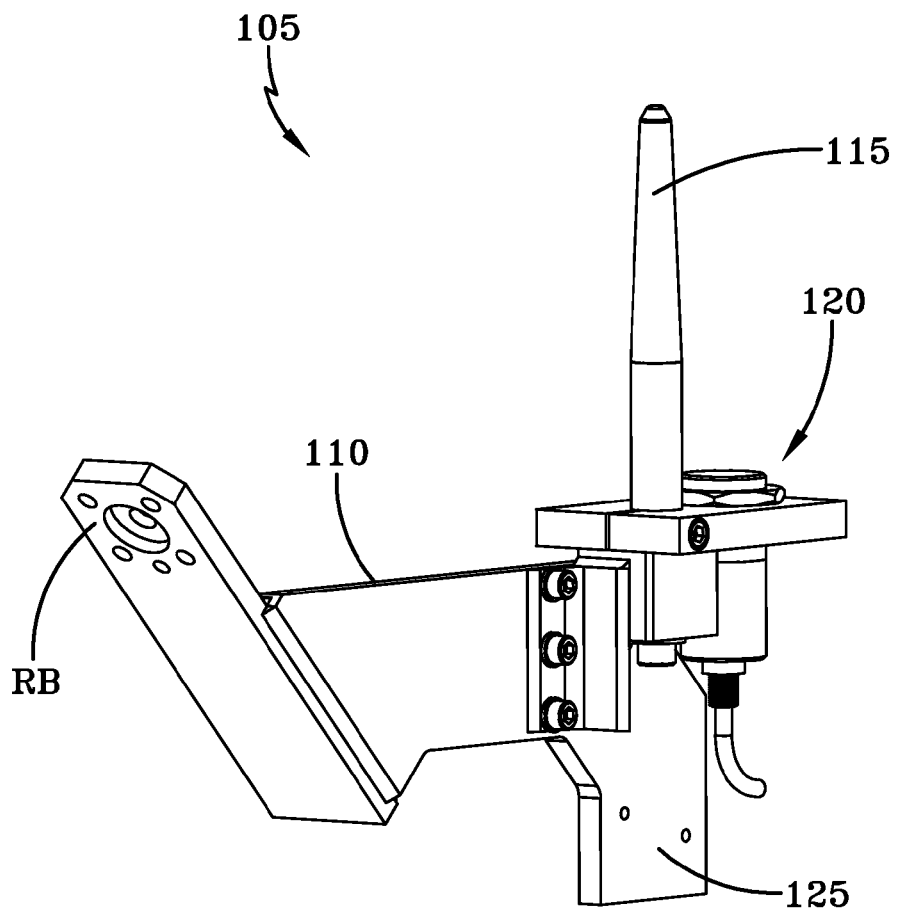
FIG. 8 is a perspective view of an end effector that may be used by a robot to disengage the cross-rail retention mechanism of FIGS. 6-7b and to adjust the position of the cross-rails along the length of the carrier fixture of FIG. 1.

An exemplary embodiment of an end effector 105 that can be used by a robot to disengage the retention mechanisms 60 and to reposition the cross-rails 20, 25, 30 is illustrated in FIG. 8. The end effector 105 has a mounting bracket 110 having a first end RB adapted for attachment to the end of a robot arm (not shown for clarity). To another portion of the mounting bracket is affixed a retention mechanism release pin 115.

Figure 9A:
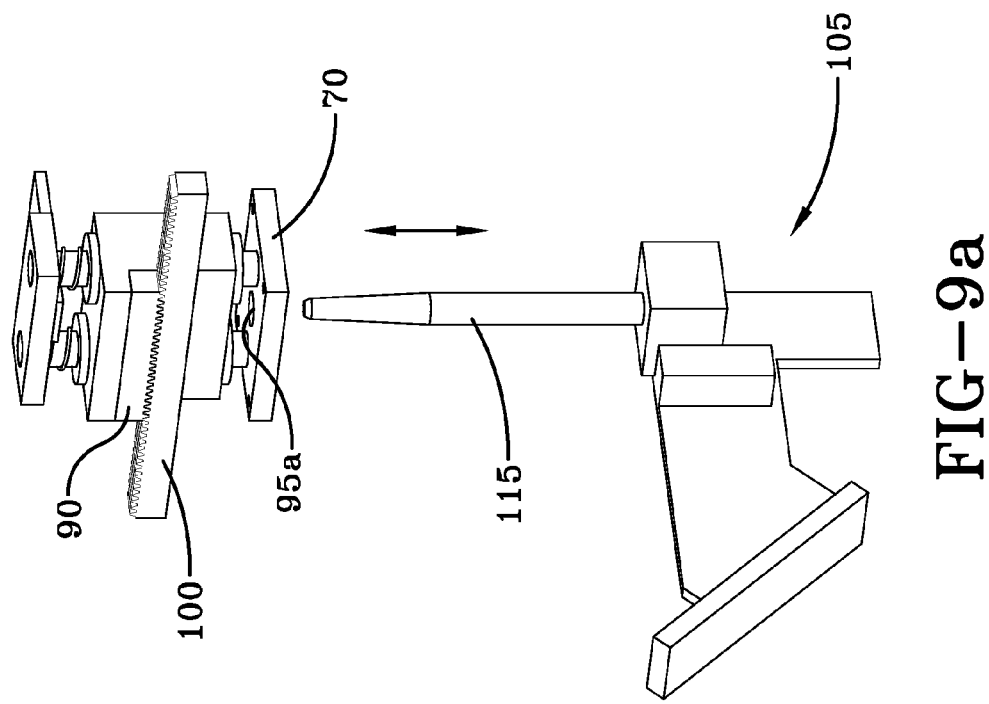
FIG. 9a illustrates the end effector of FIG. 8 being guided into contact with the cross-rail retention mechanism of FIGS. 6-7b to disengage it from a gear rack.

As can be particularly understood by reference to FIG. 9a, the retention mechanism release pin 115 is inserted through the retention mechanism access hole 95b in the cross-rail (not shown for clarity) and the retention mechanism access hole 95a in the retention mechanism mounting plate 70, and subsequently pressed against the clamping body 65 to separate the gear rack segment 90 from the gear rack 100. With the retention mechanism release pin 115 maintaining the retention mechanism 60 in the disengaged position of FIG. 9b, the robot (not shown for clarity) can then move the associated cross-rail (not shown for clarity) along the length of the frame 10. Once the new cross-rail position is reached, the robot withdraws the retention mechanism release pin 115, thereby allowing the clamping body 65 to return to its biased and engaged position with the gear rack 100 and securing the position of the cross-rail.

When disengagement of the retention mechanisms 60 and repositioning of the cross-rails is to be performed robotically, bushings or other guide means may be provided in one or both of the retention mechanism access holes 95a, 95b. Such bushings may assist in guiding the retention mechanism release pin 115 into contact with the clamping body 65, and may also prevent undesirable transverse contact between the interior walls of the retention mechanism access holes 95a, 95b and the sides of the retention mechanism release pin 115 during initiation and termination of cross-rail movement.

A robot used for repositioning the cross-rails may also be provided with external means (i.e., means other than internal Cartesian coordinate analysis) for determining whether a clamping body 65 has been sufficiently disengaged from the gear rack 100. For example, as shown in FIG. 8, a proximity sensor 120 or a similar device may be employed to signal the robot that sufficient displacement of the clamping body 65 has occurred. In this case, sufficient movement of the clamping body 65 can be assured by pressing the retention mechanism release pin 115 against the clamping body 65 until the proximity sensor 120 detects the underside of the cross-rail.

While a robot used to perform the above-described disengagement and repositioning functions may be provided uniquely for such purpose, it is also possible that such a robot might also perform other functions. For example, a suitable robot may consist of an already existing robot, such as a sealer robot or a part load/unload robot. Use of a pre-existing robot or the ability of one robot to perform multiple tasks reduces the cost associated with the present invention. When one robot is used to perform multiple functions, other end effectors such as sealing guns or part grippers may also be attached to the mounting bracket 110, such as at a portion 125 that extends oppositely from the retention mechanism release pin 115. Other arrangements are also possible. It is also contemplated that in such a situation, separate robot tooling may be provided—the tooling making use of automated tool changers or the like for minimizing the time required to change tooling.

The carrier fixture 5 is shown suspended from an overhead conveyor 135 in FIGS. 10a-10b. This suspended arrangement is presented for illustration only and nothing in FIGS. 10a-10b is intended to imply that a carrier fixture 5 of the present invention must be used with an overhead conveyor of the type shown, or be suspended from an overhead conveyor as depicted. It is to be understood that a carrier fixture 5 of the present invention may be used with any type of overhead conveyor and may be suspended therefrom at a number of locations along the frame and by various means.

In operation, it is made known when a new body panel is to be transported along the assembly line. This information may be communicated in various ways that would be understood by one skilled in the art. This information identifies, or otherwise allows it to be determined, which carrier fixtures on the conveyor line will be the first and last to carry the body panel of interest. As such, the particular carrier fixtures that must be changed over to accommodate the new body panel are known. Only a certain number of carrier fixtures may be involved, or all the carrier fixtures on the assembly line may need to be changed over.

When changeover of the involved carrier fixtures is performed manually, a worker(s) may obtain the information relevant to the changeover from a daily build sheet and/or various other sources. When changeover of the involved carrier fixtures is performed robotically, it is contemplated that a changeover signal(s) may be automatically sent to the robot (s) involved. For example, separate changeover initiation and termination signals may be sent. Alternatively, a single initiation signal may be sent, whereafter the robot will perform a changeover operation on some predetermined number of carrier fixtures. Furthermore, interlocks may be present to ensure that the conveyor cannot attempt to advance a carrier fixture while the robot is still engaged therewith.

In one particular embodiment of such a system and method, sensors on the conveyor are used to detect the position of the cross-rails, and signals from the sensors are used to determine whether the cross-rails on the carrier fixture need to be repositioned. In this embodiment, photoelectric detectors (not shown) are mounted to the conveyor 135 at the carrier fixture changeover station. The photoelectric detectors may be mounted to the conveyor rail, etc., and are adapted to detect the position of the cross-rails 20, 25, 30 of a carrier fixture 5 as the carrier fixture passes beneath the photoelectric detectors. The photoelectric detectors may operate to detect various structures on the cross-rails 20, 25, 30. However, in this particular embodiment of the carrier fixture 5, a location indicator plate 130 is affixed to each retention mechanism 60 for this specific purpose.

In operation, a programmable controller or some other system controller is supplied with information as to what particular body side panel a given carrier fixture is to transport. The controller is also provided with data relative to the correct position of each carrier fixture cross-rail for a given body side panel. As each carrier fixture 5 passes by the photoelectric detectors, it is determined whether the cross-rails 20, 25, 30 of the carrier fixture are properly positioned relative to the particular body side panel it is to transport. If the cross-rails 20, 25, 30 are properly positioned, no action need be taken. If the cross-rails 20, 25, 30 are improperly positioned, however, a signal is sent indicating that the carrier fixture requires cross-rail repositioning.

In this particular embodiment of the present invention, such a signal is sent to an upstream changeover robot. The robot then automatically operates to reposition the cross-rails 20, 25, 30 (as described above) when the carrier fixture in question reaches the carrier fixture changeover station where the robot is located. In this manner, it can be assured that the cross-rails 20, 25, 30 of each carrier will be properly positioned before the carrier fixture arrives at the body side panel loading area. Alternatively, if the changeover process is to be performed manually, the signal may simply alert an operator that a particular carrier needs cross-rail repositioning. Such an alert may identify the carrier (such as by number, etc.) and may also indicate to what position the cross-rails are to be set.

While certain exemplary embodiment(s) of the present invention are described in detail above, it should be understood that many variations may be made to the exemplary embodiment while still falling within the scope of the present invention. For example, the carrier frame may be of different size and/or shape, different carrier fixture-to-conveyor mounting means may be employed, a different number and/or type of cross-rails may be present, different hangers may be used, the cross-rail guidance system may differ, various cross-rail retention mechanisms may be substituted, etc. It should also be understood that a carrier fixture of the present invention may transport components along one or both sides thereof. Consequently, while certain specific disclosures have been made in order to best illustrate the exemplary embodiment shown, the scope of the present invention is not to be considered limited by such disclosure, and modifications are possible without departing from the spirit of the invention as evidenced by the following claims.

What is claimed is:

1. A flexible conveyor carrier fixture for transporting parts along an overhead conveyor, comprising:

a carrier frame adapted for attachment to said overhead conveyor;

at least one moveable cross-rail extending across said carrier frame in a direction substantially transverse to the direction of travel of said overhead conveyor;

at least one hanger associated with said at least one moveable cross-rail for supporting said parts in a suspended position therefrom;

a linear guide means for directing movement of said at least one cross-rail back-and-forth along said carrier frame in a direction substantially parallel to the direction of travel of said overhead conveyor; and a cross-rail retention mechanism associated with said at least one moveable cross-rail, said cross-rail retention mechanism including a spring-biased clamping mechanism having a clamping body with a gear rack segment that engages a like gear rack attached to said carrier frame when in a normal position so as to secure said at least one moveable cross-rail to said carrier frame;

wherein the position of said at least one moveable cross-rail along the length of said carrier frame can be adjusted to support parts of various shape and/or size.

2. The flexible conveyor carrier fixture of claim 1, wherein said parts are vehicle body side panels.

3. The flexible conveyor carrier fixture of claim 1, wherein a plurality of moveable cross-rails are present.

4. The flexible conveyor carrier fixture of claim 1, wherein at least one fixed position cross-rail is also present.

5. The flexible conveyor carrier fixture of claim 1, wherein said retention mechanism is released by exerting sufficient force against said clamping body to overcome said spring bias and disengage said clamping body from said gear rack.

6. The flexible conveyor carrier fixture of claim 5, wherein access to said clamping body is provided through said at least one moveable cross-rail.

7. The flexible conveyor carrier fixture of claim 1, wherein said linear guide means comprises at least one linear guide rail affixed to said frame and at least one corresponding linear guide block attached to said at least one moveable cross-rail.

8. The flexible conveyor carrier fixture of claim 1, wherein said at least one moveable cross-rail supports parts on both sides of said overhead conveyor.

9. The flexible conveyor carrier fixture of claim 1, wherein said at least one moveable cross-rail supports parts on only one side of said overhead conveyor.

10. The flexible conveyor carrier fixture of claim 1, further comprising means for indicating the position of said at least one moveable cross-rail.

11. The flexible conveyor carrier fixture of claim 10, wherein said means for indicating the position of said at least one moveable cross-rail is a numeric scale.

12. A flexible conveyor carrier fixture for facilitating the transport of dissimilar body side panels along an overhead conveyor, comprising:

a carrier frame adapted for attachment to said overhead conveyor, said carrier frame having a length dimension extending along the direction of travel of said overhead conveyor, and a width dimension extending substantially transverse thereto;

a moveable front, center and rear cross-rail residing below and extending across the width of said carrier frame;

at least one hanger located at or near an end of each of said front and rear cross-rails, said hangers for supporting said body side panels in a suspended position therefrom;

a position adjusting/setting element located at or near an end of said center cross-rail, said position adjusting/setting element for locating said body side panels along the length of said carrier frame;

a pair of linear guide rails extending along the length of said carrier frame;

a corresponding pair of linear guide blocks attached to each cross-rail and engaged with said linear guide rails to direct movement of said cross-rails along the length of said carrier frame;

a cross-rail retention mechanism associated with each cross-rail and operative to secure the position of its associated cross-rail along the length of said carrier frame; and a cross-rail position indicator for identifying the positions of said cross-rails.

13. The flexible conveyor carrier fixture of claim 12, wherein at least one fixed position cross-rail is also present.

14. The flexible conveyor carrier fixture of claim 12, wherein said cross-rail retention mechanism comprises a spring-biased clamping mechanism that secures said at least one moveable cross-rail to said carrier frame.

15. The flexible conveyor carrier fixture of claim 14, wherein said spring-biased clamping mechanism includes a clamping body having a gear rack segment that engages a like gear rack attached to said carrier frame when in a normal position.

16. The flexible conveyor carrier fixture of claim 15, wherein said retention mechanism is released by exerting sufficient force against said clamping body to overcome said spring bias and disengage said clamping body from said gear rack.

17. The flexible conveyor carrier fixture of claim 16, wherein access to said clamping body is provided through its associated cross-rail.

18. The flexible conveyor carrier fixture of claim 12, wherein said carrier fixture is adapted to transport body side panels along both sides of said overhead conveyor.

19. The flexible conveyor carrier fixture of claim 12, wherein said carrier fixture is adapted to transport body side panels along only one side of said overhead conveyor.

20. The flexible conveyor carrier fixture of claim 12, wherein said cross-rail position indicator is a numeric scale.

21. The flexible conveyor carrier fixture of claim 12, wherein said hangers are grooved to receive an edge of said body panels.

22. A method of transporting dissimilar parts along an overhead conveyor, comprising:

connecting at least one flexible conveyor carrier fixture to said overhead conveyor, said at least one flexible conveyor carrier fixture further comprising:

(a) a carrier frame adapted for attachment to said overhead conveyor, (b) at least one moveable cross-rail extending across said carrier frame in a direction substantially transverse to the direction of travel of said overhead conveyor, (c) at least one hanger associated with said at least one moveable cross-rail for supporting said parts in a suspended position therefrom, (d) a linear guide means for directing movement of said at least one cross-rail back-and-forth along said carrier frame in a direction substantially parallel to the direction of travel of said overhead conveyor, and (e) a cross-rail retention mechanism associated with said at least one moveable cross-rail and operative to secure the position of said at least one moveable cross-rail along the length of said carrier frame, providing a robot end effector adapted to mate with said cross-rail retention mechanism; and using a robot equipped with said end effector to disengage said cross-rail retention mechanism and to subsequently reposition said at least one moveable crossrail along said carrier frame as needed to allow said flexible conveyor carrier fixture to accommodate parts of different size and/or shape.

23. The method of claim 22, wherein said robot also performs at least one other task unrelated to the repositioning of said at least one moveable cross-rail.

24. The method of claim 22, wherein said cross-rail retention mechanism comprises a spring-biased clamping mechanism that includes a clamping body having a gear rack segment that engages a like gear rack attached to said carrier frame when in a normal position.

25. The method of claim 24, wherein said retention mechanism is released by using said robot to exert sufficient force against said clamping body with said end effector to overcome said spring bias and disengage said clamping body from said gear rack.

26. The method of claim 25, wherein said end effector is an elongated pin.

27. The method of claim 25, further comprising an access hole in said at least one moveable cross-rail for allowing said end effector to pass therethrough and contact said clamping body.

28. The method of claim 25, further comprising a proximity sensor associated with said robot to detect when said clamping body has been sufficiently displaced by said end effector so as to be disengaged from said gear rack.

29. The method of claim 22, wherein said robot is provided with numerical coordinate data that allows it to properly position said at least one moveable cross-rail along said carrier frame with respect to each dissimilar part to be transported.

30. The method of claim 22, wherein said parts are vehicle side body panels.

31. A flexible conveyor carrier fixture for transporting parts along an overhead conveyor, comprising:
- a carrier frame adapted for attachment to said overhead conveyor;
- at least one moveable cross-rail extending across said carrier frame in a direction substantially transverse to the direction of travel of said overhead conveyor;
- at least one hanger associated with said at least one moveable cross-rail for supporting said parts in a suspended position therefrom;
- a linear guide means for directing movement of said at least one cross-rail back-and-forth along said carrier frame in a direction substantially parallel to the direction of travel of said overhead conveyor;
- a cross-rail retention mechanism associated with said at least one moveable cross-rail and operative to secure the position of said at least one moveable cross-rail along the length of said carrier frame; and
- a numeric scale for indicating the position of said at least one moveable cross-rail;
- wherein the position of said at least one moveable cross-rail along the length of said carrier frame can be adjusted to support parts of various shape and/or size.

32. The flexible conveyor carrier fixture of claim 31, wherein said parts are vehicle body side panels.

* * * * *